(12) United States Patent
Arriola et al.

(10) Patent No.: US 9,701,231 B2
(45) Date of Patent: Jul. 11, 2017

(54) SEAT HEADREST

(71) Applicant: Cardiff Products, San Marcos, CA (US)

(72) Inventors: Jason Arriola, San Marcos, CA (US); William Regan, Carlsbad, CA (US)

(73) Assignee: Cardiff Products, San Marcos, CA (US)

( * ) Notice: Subject to any disclaimer, the term of this patent is extended or adjusted under 35 U.S.C. 154(b) by 4 days.

(21) Appl. No.: 14/860,399

(22) Filed: Sep. 21, 2015

(65) Prior Publication Data

US 2016/0130003 A1 May 12, 2016

Related U.S. Application Data

(63) Continuation-in-part of application No. 14/407,057, filed as application No. PCT/US2013/045134 on Jun. 11, 2013.

(60) Provisional application No. 61/658,041, filed on Jun. 11, 2012.

(51) Int. Cl.
*B60N 2/48* (2006.01)
*B60N 2/44* (2006.01)

(52) U.S. Cl.
CPC ......... *B60N 2/4879* (2013.01); *B60N 2/4882* (2013.01); *B60N 2/485* (2013.01); *B60N 2/4844* (2013.01); *B60N 2/4847* (2013.01); *B60N 2002/4405* (2013.01)

(58) Field of Classification Search
USPC .................................. 297/402, 400, 399, 397
See application file for complete search history.

(56) References Cited

U.S. PATENT DOCUMENTS

| | | | | |
|---|---|---|---|---|
| 162,784 A | * | 5/1875 | White | A47C 7/383 297/402 |
| 217,169 A | * | 7/1879 | Taylor | B60N 2/4879 297/399 |
| 221,752 A | * | 11/1879 | Taylor | B60N 2/4879 297/398 |
| 236,212 A | * | 1/1881 | Cartwright | A45D 44/10 297/402 |
| 389,938 A | * | 9/1888 | Parkhill | B60N 2/4879 297/400 |
| 426,069 A | * | 4/1890 | Rogers | A45D 44/10 297/402 |
| 716,209 A | * | 12/1902 | Elliott | A45D 44/10 297/402 |

(Continued)

FOREIGN PATENT DOCUMENTS

FR      2836100      8/2003

OTHER PUBLICATIONS

Universal Rear Seat Headrest Mount for Tablets. Installation Manual. Arkon Resources, Inc. 2011. URL: http://www.arkon.com/manuals/TAB-RSHM.pdf.

*Primary Examiner* — David E Allred
(74) *Attorney, Agent, or Firm* — Lewis Kohn & Walker LLP; David M. Kohn; Kari Moyer-Henry

(57) ABSTRACT

A seat headrest having a side cushion and a mounting mechanism for use in conjunction with existing, standard airplane seat headrests. The seat headrest has an adjustable side cushion to provide head and neck support by serving as headrests on the side of a user's head. The user may be any individual in a passenger airplane.

18 Claims, 20 Drawing Sheets

(56) References Cited

U.S. PATENT DOCUMENTS

| | | | | |
|---|---|---|---|---|
| 2,492,383 A * | 12/1949 | Jones | ............... | A61B 90/14 |
| | | | | 128/845 |
| 2,638,152 A * | 5/1953 | Pulsifer | ............ | A47C 7/383 |
| | | | | 297/400 |
| 2,869,621 A * | 1/1959 | Zukor | ............... | A47C 7/38 |
| | | | | 297/400 |
| 3,387,886 A * | 6/1968 | Longo | ............ | B60N 2/4879 |
| | | | | 297/397 |
| 3,578,383 A | 5/1971 | Earl | | |
| 4,440,443 A | 4/1984 | Nordskog | | |
| 4,796,953 A * | 1/1989 | Pereira | ............ | B60N 2/4864 |
| | | | | 297/400 |
| 5,154,477 A | 10/1992 | Lacy | | |
| 5,505,523 A | 4/1996 | Wang | | |
| 6,789,851 B2 | 9/2004 | Smith | | |
| 7,938,491 B2 | 5/2011 | Montnore | | |
| 7,958,582 B1 | 6/2011 | Scamardo | | |
| 2007/0273194 A1* | 11/2007 | Fraser | ............... | A47C 7/383 |
| | | | | 297/397 |
| 2010/0289315 A1 | 11/2010 | Jackson | | |
| 2012/0007405 A1 | 1/2012 | Kim | | |
| 2012/0091778 A1* | 4/2012 | Johnson | ............ | B60N 2/4879 |
| | | | | 297/397 |
| 2012/0104807 A1* | 5/2012 | Lauchle | ............ | A47C 7/383 |
| | | | | 297/180.11 |
| 2012/0235455 A1* | 9/2012 | Maassarani | ............ | A47C 7/383 |
| | | | | 297/250.1 |
| 2012/0292973 A1* | 11/2012 | Westerink | ............ | B64D 11/06 |
| | | | | 297/391 |
| 2013/0112841 A1* | 5/2013 | Fan | ............ | F16M 13/00 |
| | | | | 248/622 |

* cited by examiner

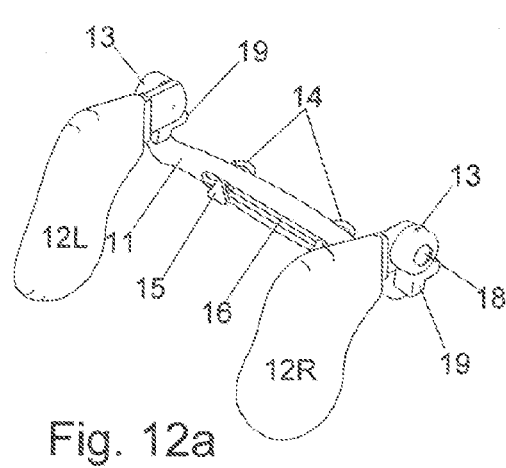
Fig. 12a
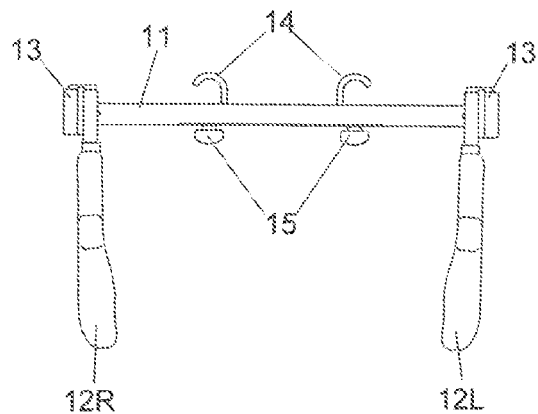
Fig. 12b
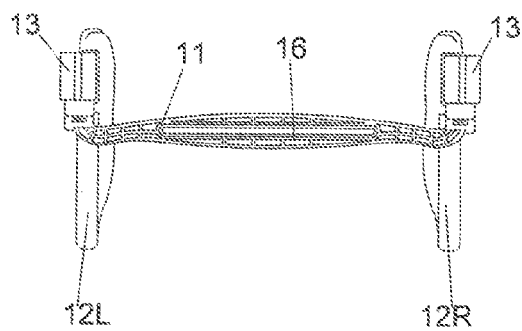
Fig. 12c
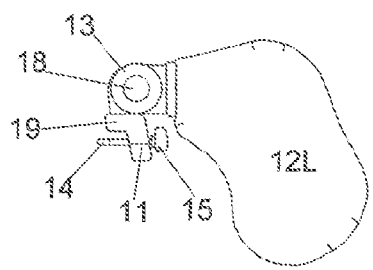
Fig. 12d
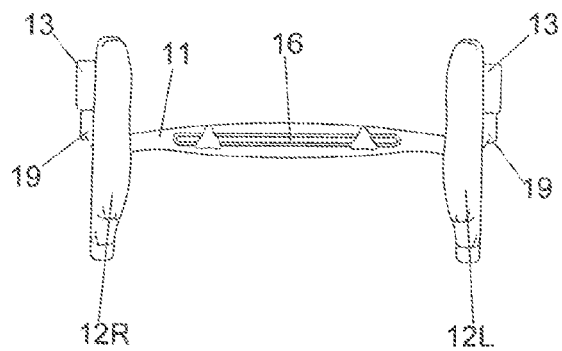
Fig. 12e
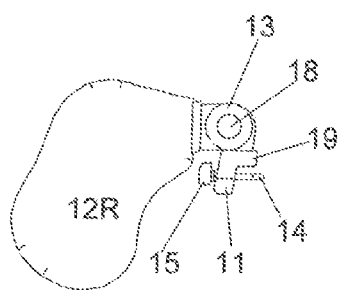
Fig. 12f
Fig. 12

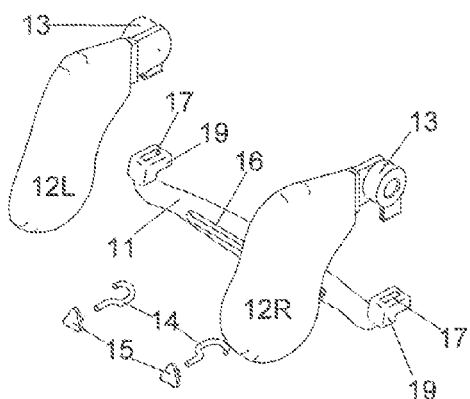
Fig. 13a
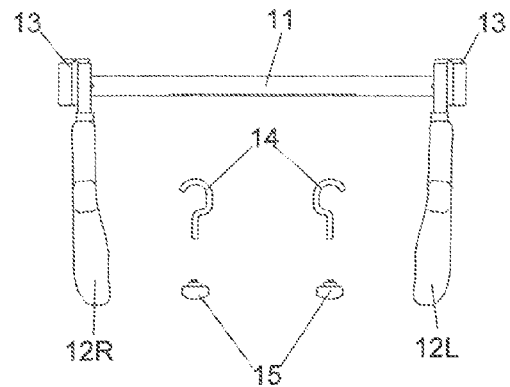
Fig. 13b
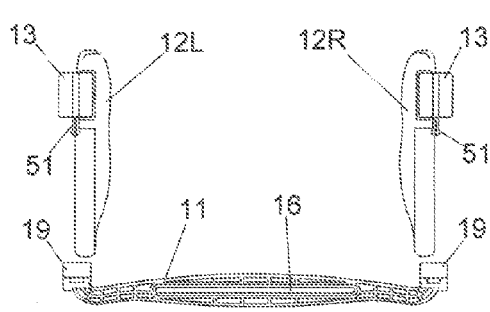
Fig. 13c
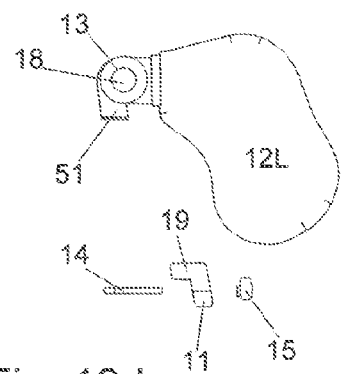
Fig. 13d
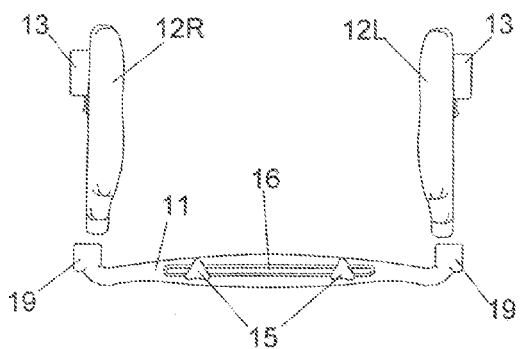
Fig. 13e
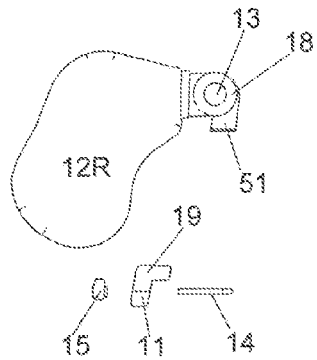
Fig. 13f
Fig. 13

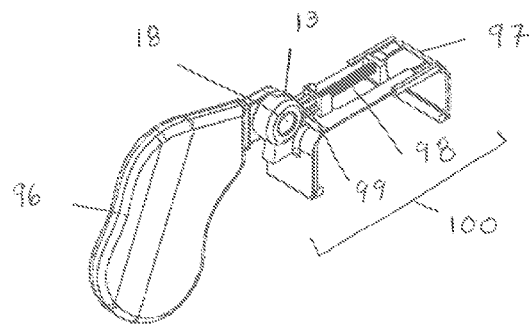
Figure 20a
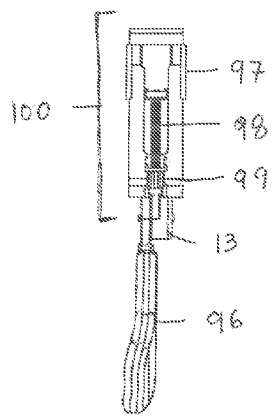
Figure 20b
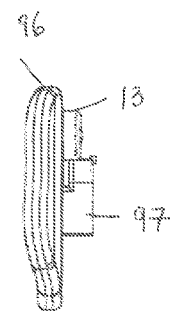
Figure 20c
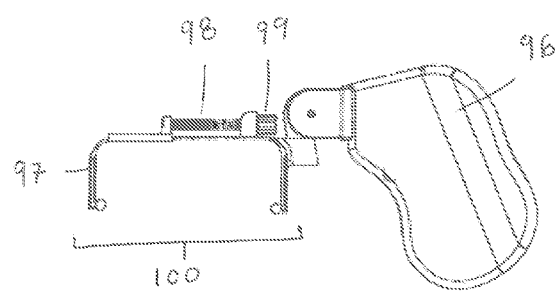
Figure 20d
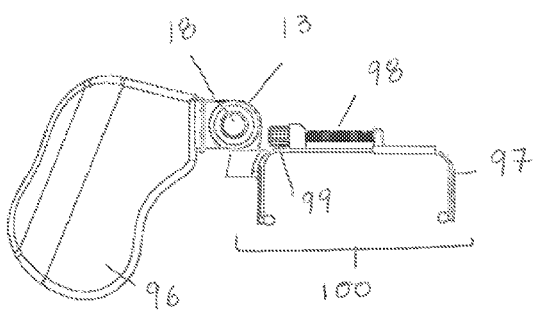
Figure 20e
FIGURE 20

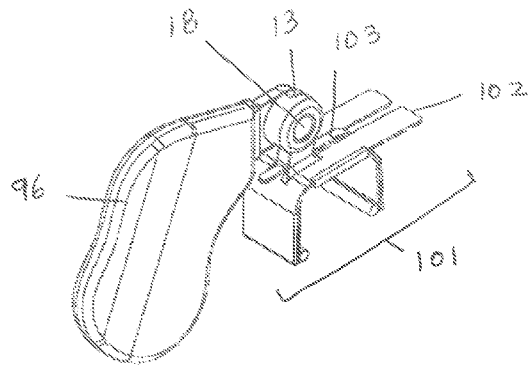
Figure 21a
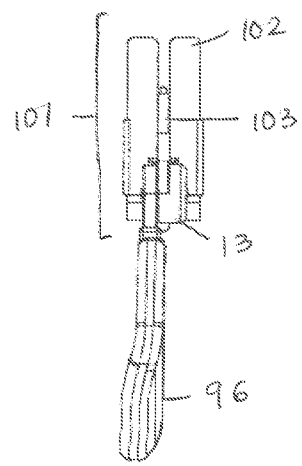
Figure 21b
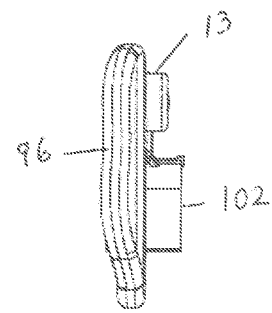
Figure 21c
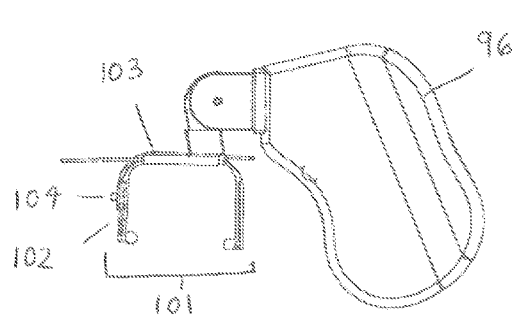
Figure 21d
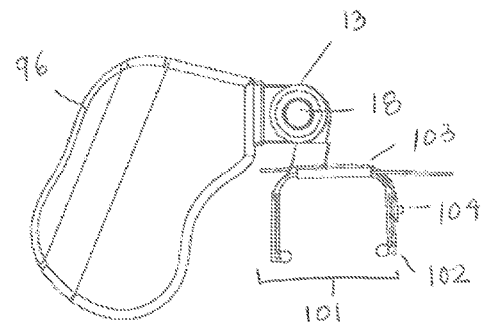
Figure 21e
FIGURE 21

SEAT HEADREST

RELATED APPLICATIONS

This application is a Continuation-in-part claiming the benefit of priority from U.S. patent application Ser. No. 14/407,057 filed Dec. 10, 2014, a United States National Stage Application claiming priority under 35 U.S.C. 371 from International Patent Application No. PCT/US13/45134 filed on Jun. 11, 2013, which claims priority from U.S. Provisional Application No. 61/658,041, filed on Jun. 11, 2012, the contents of which are hereby incorporated by reference herein.

FIELD OF THE INVENTION

The present invention pertains generally to seat headrests. More particularly, the present invention pertains to a supplemental headrest attached to currently existing car seats with headrests.

BACKGROUND OF THE ART

Car headrests are well known in the art. Since the 1960's, cars have included headrests as standard equipment. One of the more prevalent designs of the car headrest has a padded surface attached to two headrest posts which lock into position. The padded surface is positioned to be at the rear of a head of a user and does not provide any support elsewhere.

Neck pillows are also well known in the art. A common configuration of a neck pillow has a generally 'U' shaped pillow placed around a neck to provide a pillow base around a head. This configuration does not have sufficiently structural support outside of the density of the pillow itself. The neck pillow also does not have rigidity in terms of positioning. This means that the neck pillow will shift and move along with the user causing it to not be positioned in a way most optimal for resting or sleeping.

U.S. Pat. No. 4,440,443 to Nordskog discloses a headrest inflated with air or liquid, or filled with foamed plastic material for attachment to the backrest of a chair, sofa, etc. The headrest may also provide improved privacy through incorporation of a privacy roof and eye shield. When not in use the headrest may be removed from the backrest for storage.

U.S. Pat. No. 5,154,477 to Lacy discloses a head support attachable to a vehicle seat for providing both frontal and lateral support of the head. However, attachment of the head support is dependent on a jacket or slipcover being placed over the vehicle seat and secured with a hook-and-loop-type fastener.

U.S. Pat. No. 5,505,523 to Wang discloses a safety nap cushion for use with a chair back consisting of a reverse U-shaped inflatable back cushion, two inflatable side cushions and an adjustable retraining strap suitable for being positioned over the user's face and across the front of the side cushions to prevent lateral movement of the side cushions when under pressure.

U.S. Pat. No. 6,789,851 to Smith discloses a child's sleep collar for use with a child safety seat that includes a pair of collar supports and provides lateral and frontal support to the head of a sleeping child restrained in the child safety seat. Each of the individual collar supports includes a coupling end for attachment to the child safety seat.

U.S. Pat. No. 7,938,491 to Montuore discloses a curved shape head rest to provide full head support backing with two concave sides of equal proportion to support the head while turned as well as preventing the neck from tilting at an uncomfortable angle. The headrest attaches to the existing headrest on a seat by adjustable straps.

United States Patent Publication No. 2010/0289315 to Jackson discloses a head and neck support for a passenger in a vehicle including a rod for joining the apparatus to a seat headrest and side rods for supporting cushions. Positioning of the side cushions is restricted to a vertical movement up or down the length of the side rod.

United States Patent Publication No. 2012/0007405 to Kim discloses a car seat headrest comprising a holding bar and a head support portion attached to the holding bar. Installation of the headrest to a car seat requires the complete removal of the existing headrest in order to be able to insert the headrest stays into the openings in the holding bar. Positioning of the headrest pillow requires disassembly of the headrest and additional components to accomplish alternative configurations of the pillows.

In light of the above, it is an object of the present invention to provide the desired features described herein as well as additional advantages such as providing a user with supplemental head and neck support when desired. The compact design of the supplemental headrest provides for convenient stowage when the headrest is not in use. The key to a compact design is the minimal base and integrated hinge as part of each side cushion. Preferably, the seat headrest is used in conjunction with an already existing seat headrest. Another object of the present invention is to provide a seat headrest that is easily assembled and disassembled for ease of transport and compatibility with all types of seats with existing headrests.

It is an object of this invention to provide a system and method to provide head and neck support supplementing currently existing seat headrests.

SUMMARY OF THE INVENTION

The present invention is directed to solving a deficiency in the art of car headrests. The present invention describes a seat headrest having at least one side cushion, a base and a plurality of headrest connection points. The seat headrest may have a first side cushion and a second side cushion.

The standard car headrest only provides support to the back of the head without regard to the left side or the right side of the head due to its positioning. The first side cushion and the second side cushion provide head and neck support by serving as headrests on the sides of the user's head. The user can then rest their head on the first or second side cushion for a more comfortable resting or sleeping position.

The side cushion, the base and the plurality of headrest connection points are preferably constructed from injection molded plastic to provide a sturdy and rigid structure. The side cushion may then be covered by a padded material such as foam to provide a soft, cushioned surface. The side cushion is then wrapped by a soft outer material such as fabric or nylon to cover the padded material and provide a more desirable aesthetic. The soft outer material can have a design print or be monochrome without departing from the spirit of the present invention. There may also be an expandable fabric hood or a strap that attaches over the car's original headrest as an optional mounting type to accommodate vehicle headrests not supported by support rods. The side cushion is curved about a midpoint, and the first side cushion and the second side cushion extend downwardly from the headrest arm.

The headrest arm is vertically adjustable by having hinges located in the side cushions where the side cushions attach to the base allowing for variable vertical positioning of the side cushions independently of each other.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 12 illustrates several views of the assembled seat headrest as 12a, 12b, 12c, 12d, 12e and 12f.

FIG. 13 illustrates several exploded views of the seat headrest as 13a, 13b, 13c, 13d, 13e and 13f.

FIG. 20 illustrates several views of an assembled seat headrest in an alternative embodiment as 20a, 20b, 20c, 20d and 20e.

FIG. 21 illustrates several views of an assembled seat headrest in an alternative embodiment as 21a, 21b, 21c, 21d, and 21e.

DETAILED DESCRIPTION OF THE INVENTION

Figure 1:
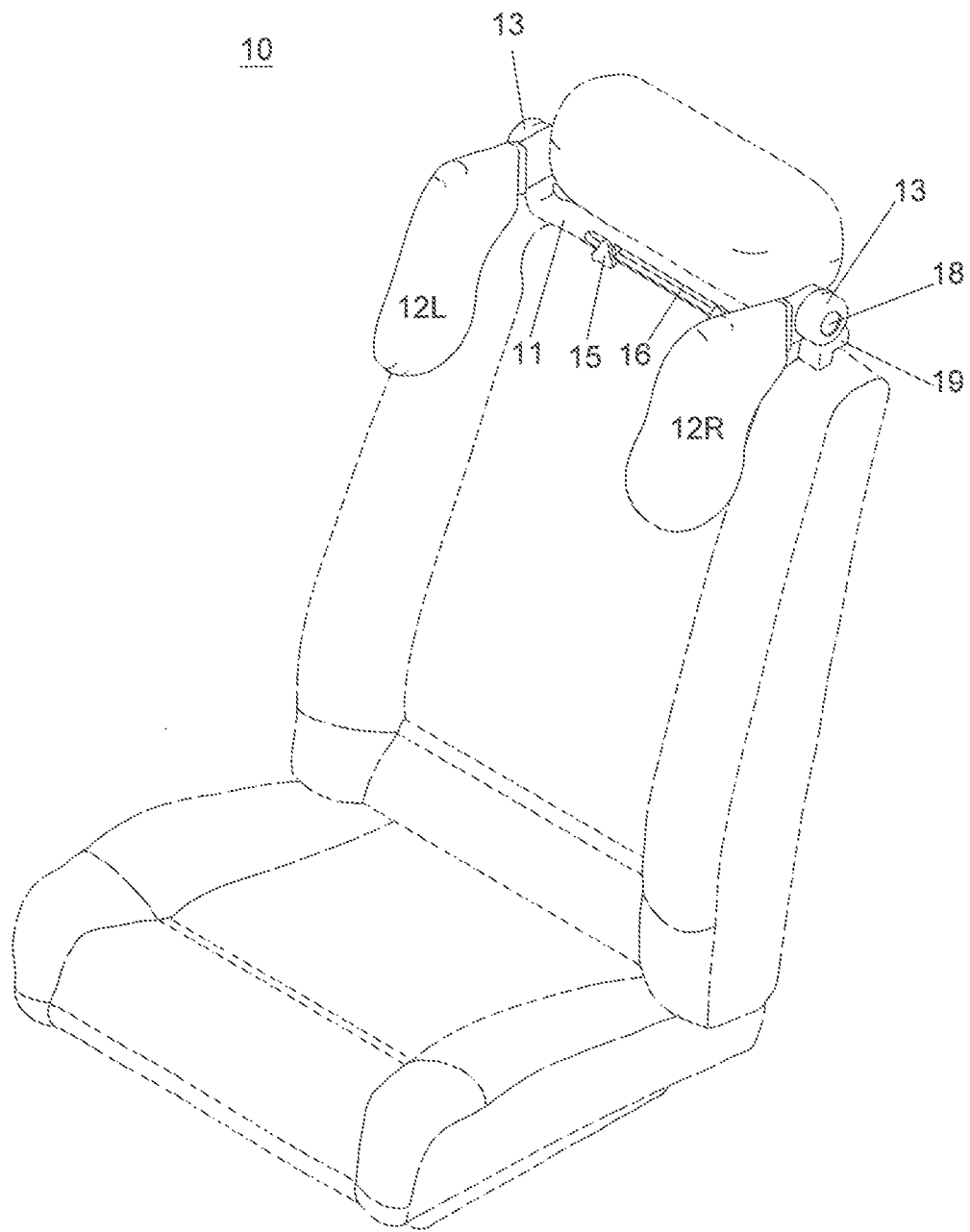
FIG. 1 illustrates a perspective view of the seat headrest.

Reference is made to FIG. 1 which illustrates one embodiment of the seat headrest 10 fully assembled and installed on a car seat. The seat headrest 10 is configured to provide additional head and neck support for a user when used in conjunction with a car headrest having a plurality of car headrest poles. The seat headrest 10 has a base 11 with one base arm 19 extending approximately perpendicular to the base Hat each lateral end which serves as the mounting point for a first side cushion 12L and a second side cushion 12R.

The first side cushion 12L and the second side cushion 12R are mounted to the base 11 at the hinge 13. Each hinge 13 has a push button 18 which functions to activate the hinge assembly (no shown). The base 11 is mounted to the existing car headrest using adjustable knobs 15 at central opening 16. The first side cushion 12L and the second side cushion 12R are bent downward from the base arm 19 to point generally downward towards a user's shoulders. This configuration of the first and second side cushions (12L and 12R) allows for slight restraint across the user's shoulders. The position of the first and second side cushions (12L and 12R) allows the user to rest their head on a rigidly positioned surface that is not normally provided by the car headrest. The user can then sleep without resulting head and neck pains caused by having their head falling into a poor position for an extended period of time.

Figure 2:
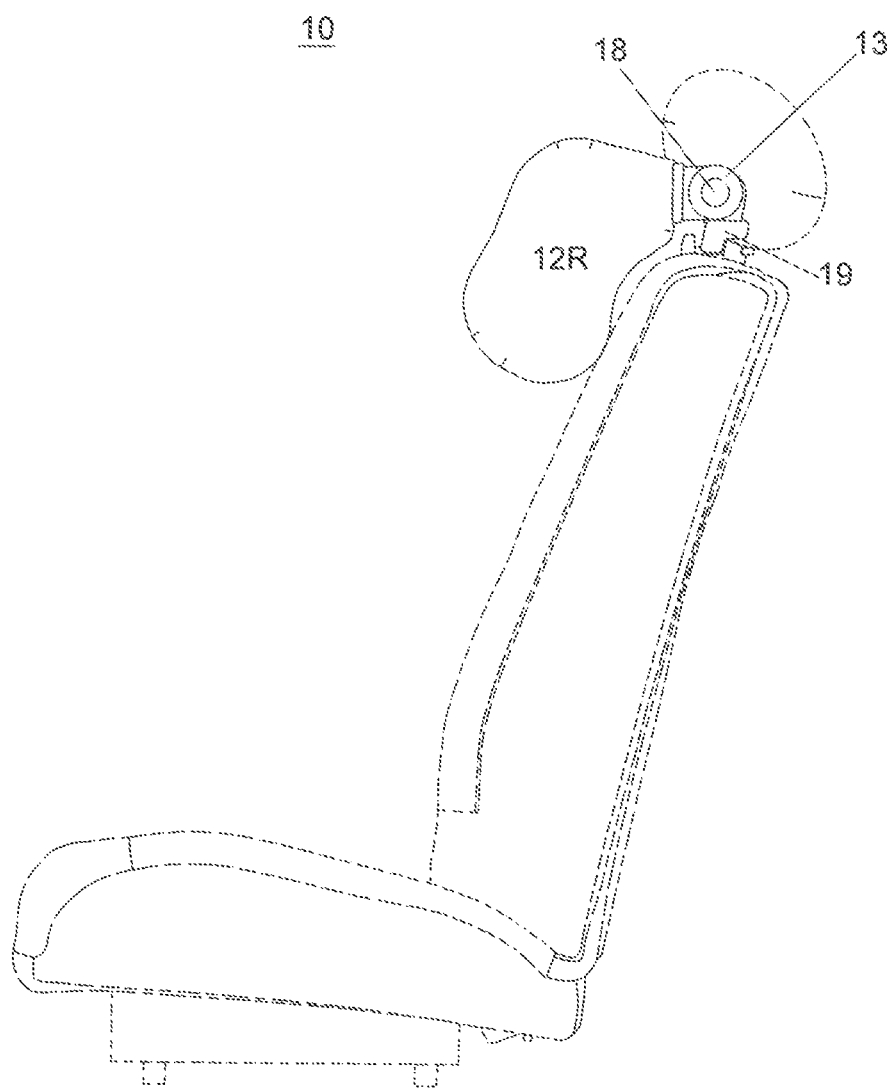
FIG. 2 illustrates a side view of the seat headrest.

Reference is made to FIG. 2 which illustrates the side view of the seat headrest 10 shown in FIG. 1. The seat headrest 10 is configured of a side cushion 12R mounted to the base 11 (not shown) at the base arm 19. The side cushion 12R, also includes a hinge 13 with a push button 18.

Figure 3:
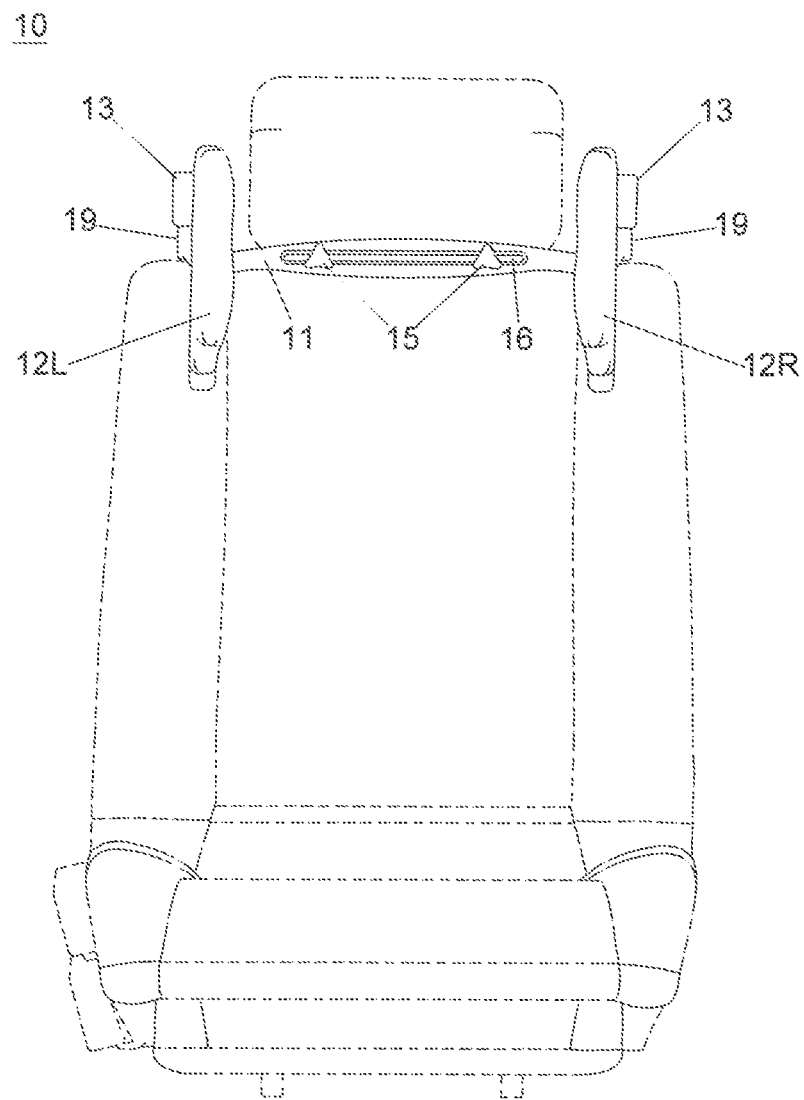
FIG. 3 illustrates a front view of the seat headrest.

Reference is made to FIG. 3 which illustrates the front view of the seat headrest 10 shown in FIG. 1. The seat headrest 10 is comprised of a base 11 with one base arm 19 at each lateral end of the base 11 and a first side cushion 12L and a second side cushion 12R attached to the base 11 at base arm 19. The first side cushion 12L and the second side cushion 12R each have an independently acting hinge 13. The seat headrest 10 is mounted to the existing car seat in part by adjustable knobs 15 at central opening 16.

Figure 4:
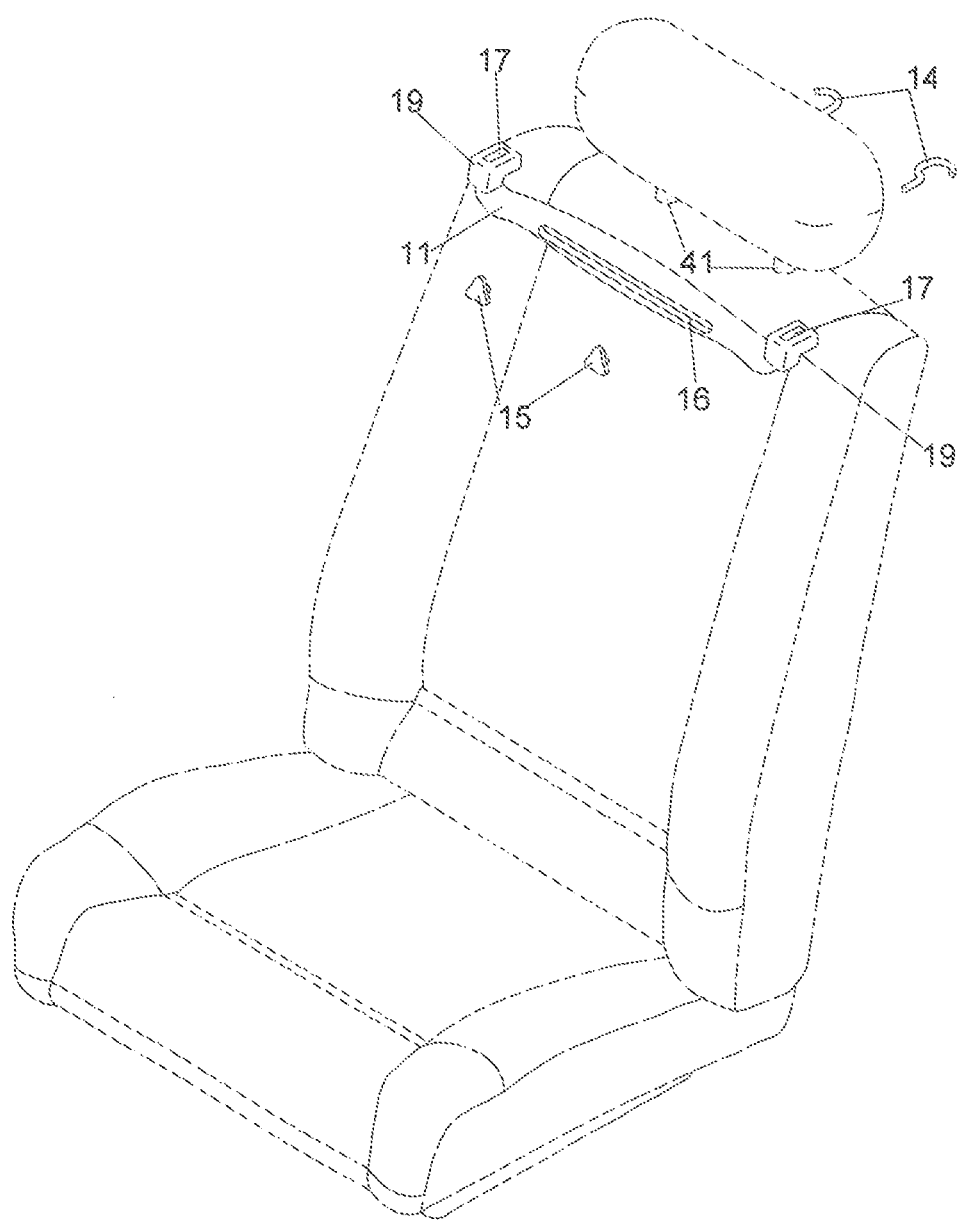
FIG. 4 illustrates an exploded perspective view of the base mount of the seat headrest.

Reference is made to FIG. 4 which illustrates the perspective view of the assembly of the base mount of the seat headrest shown in FIG. 1. The base 11 secures to the plurality of car headrest poles 41 by a plurality of headrest connection points made up of screw hooks 14 and adjustable knobs 15 configured to hold securely about the diameter of the plurality of car headrest poles 41. The plurality of screw hooks 14 can slide horizontally along opening 16 in the base 11 to accommodate for the variable distance between the plurality of car headrest poles 41 which exists between vehicle models and types, i.e. planes, trains, etc. The base anus 19 having recess 17 are positioned such that once the base 11 is mounted to a car seat, the base arms 19 sit at roughly the outer edge of the standard car headrest.

Figure 5:
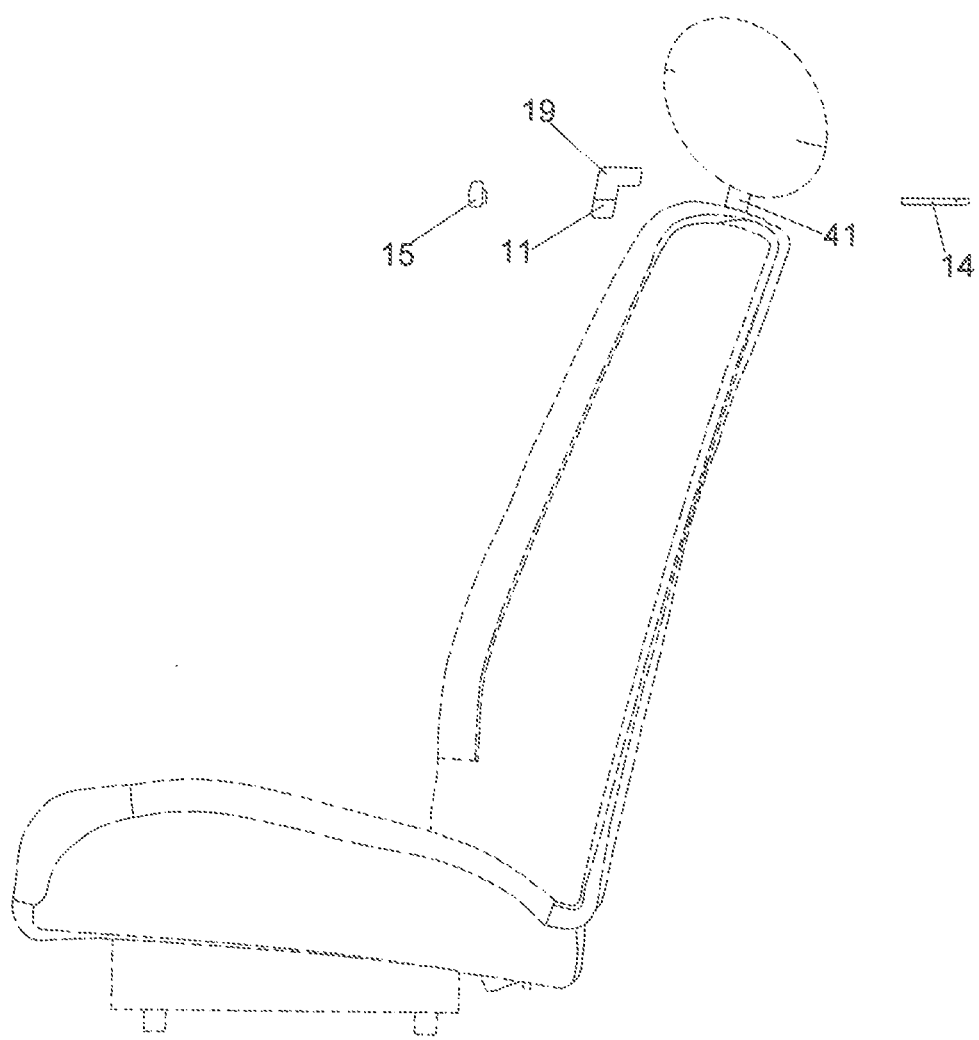
FIG. 5 illustrates an exploded side view of the base mount of the seat headrest.

Reference is made to FIG. 5 which illustrates the side view of the assembly of the base mount of the seat headrest shown in FIG. 4. The base 11 secures to the plurality of car headrest pales 41 by screw hooks 14 secured, with adjustable knobs 15. Once base 11 is mounted to the car seat, base arm 19 is positioned externally to the outer edge of the standard car headrest.

Figure 6:
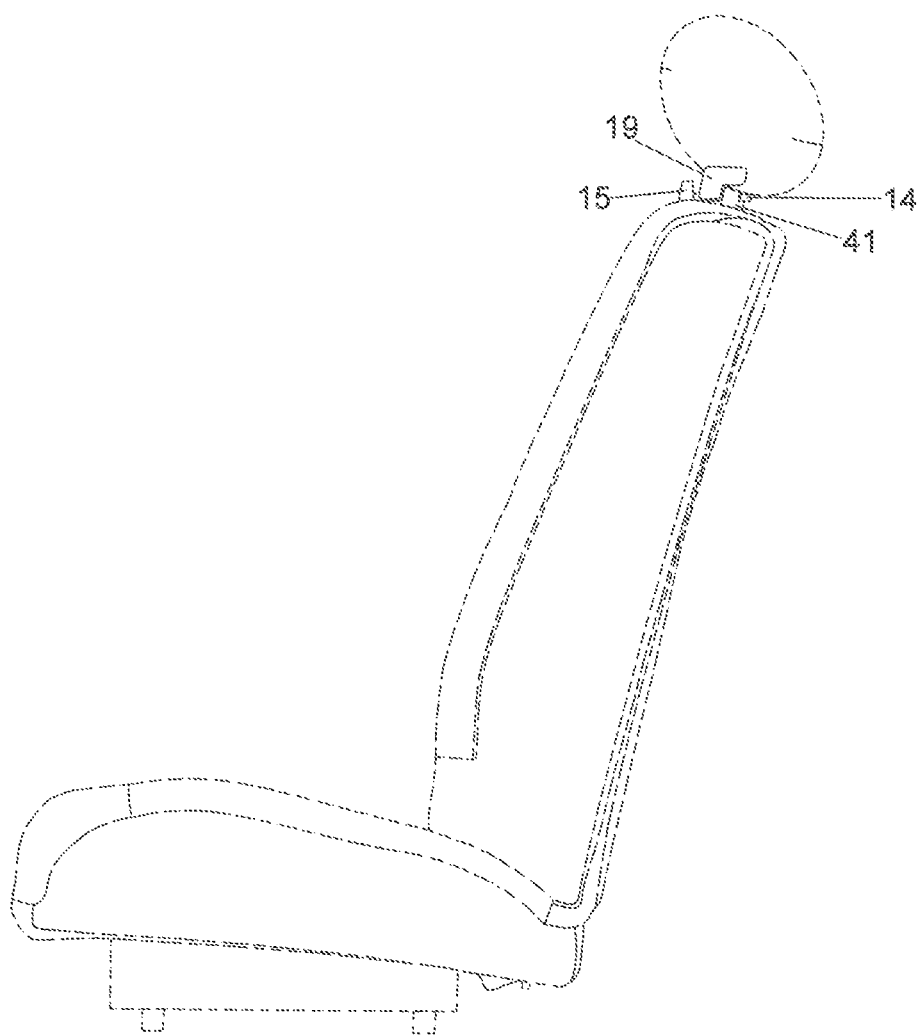
FIG. 6 illustrates a side view of the base mount of the seat headrest.
Figure 7:
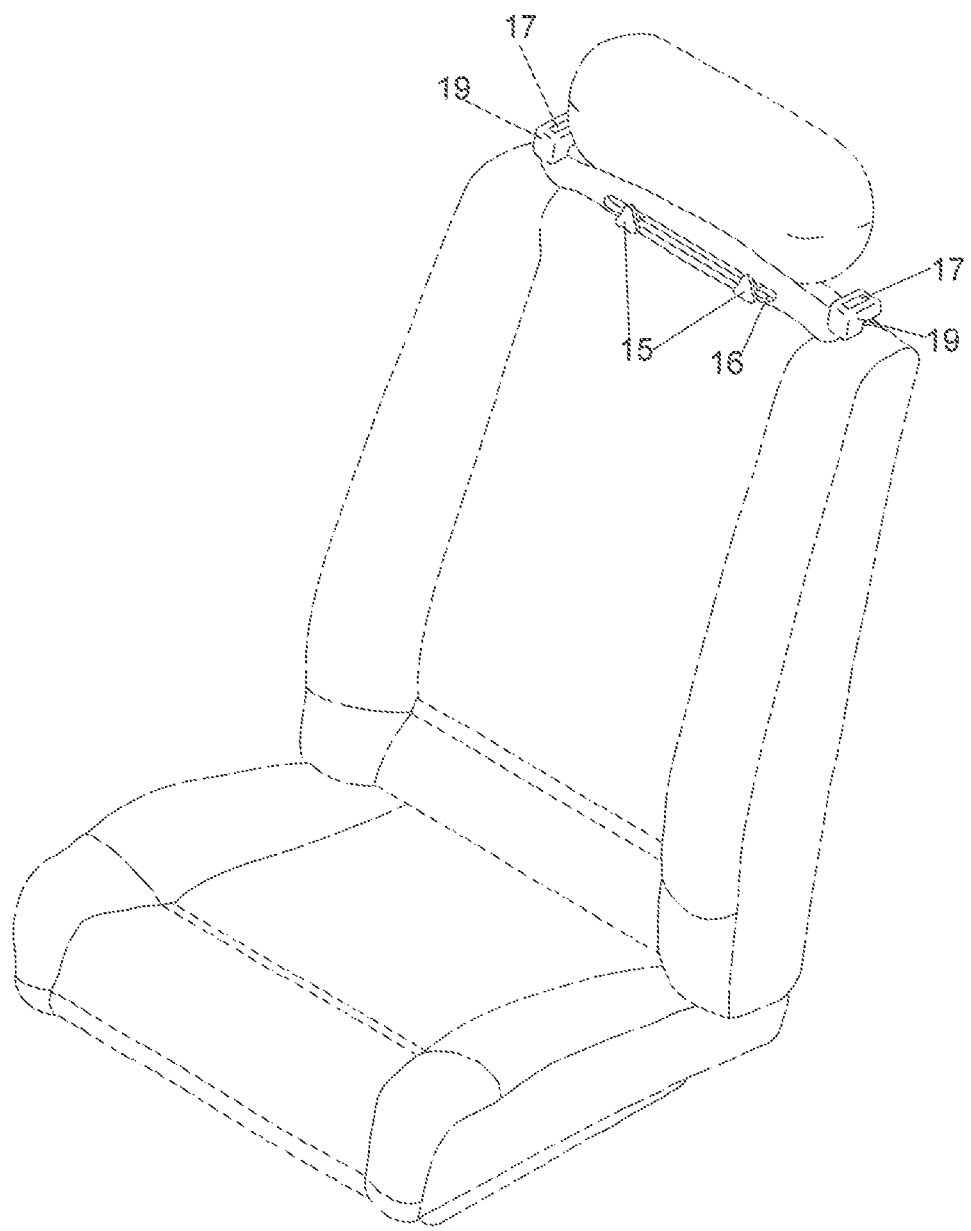
FIG. 7 illustrates a perspective view of the base mount of the seat headrest.
Figure 8:
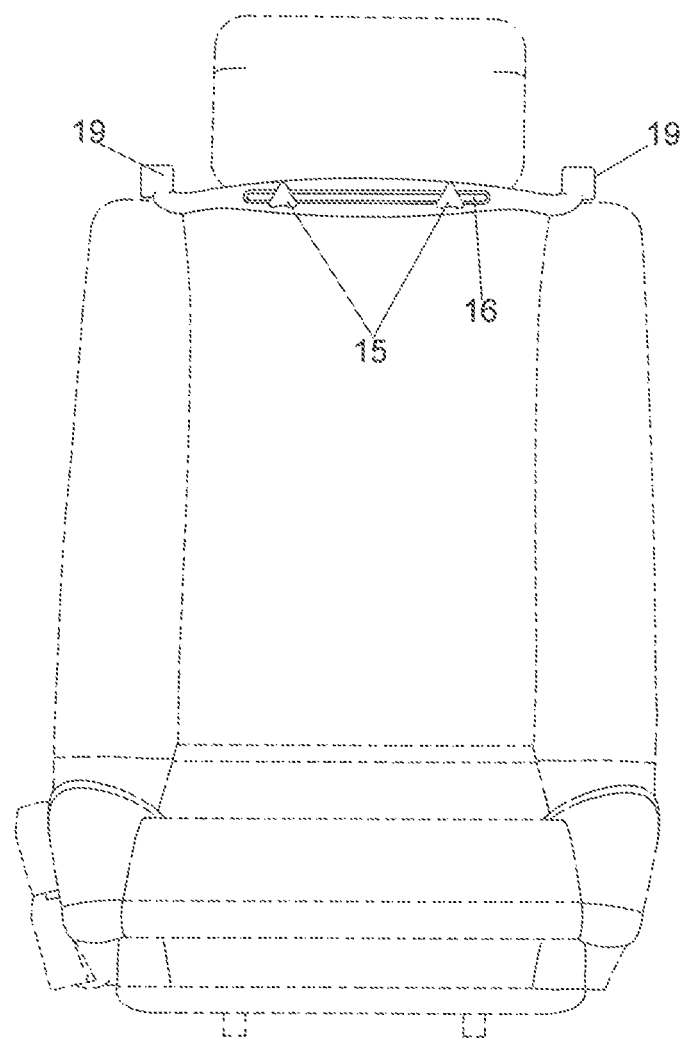
FIG. 8 illustrates a front view of the base mount of the of the seat headrest.

Reference is made to FIGS. 6, 7 and 8 which illustrate the side, perspective and front views of the mounted base of FIG. 4. FIG. 6 shows the base arm 19 positioned relative to the standard ear headrest secured by screw hook 14 and adjustable knob 15. FIGS. 7 and 8 show the base 11 mounted securely between the car seat and standard ear headrest in part by adjustable knobs 15 at central opening 16 such that the base arms 19 and recess 17 are positioned externally to the standard car headrest.

Figure 9:
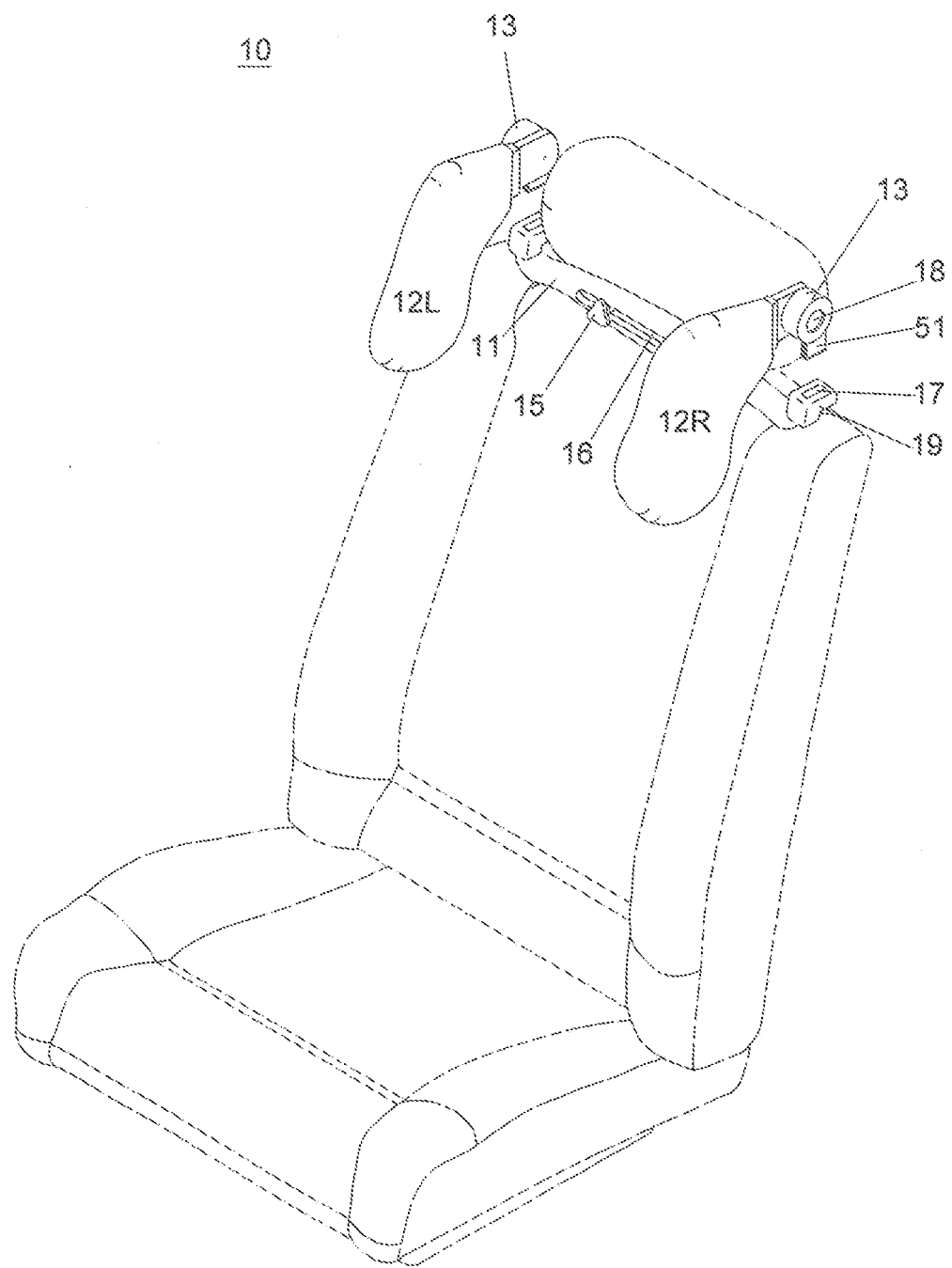
FIG. 9 illustrates a perspective view of the assembly of the side cushions to the base mount of the seat headrest.

Reference is made to FIG. 9 which illustrates an exploded view of the assembly of the side cushions 12L and 12R onto the base 11. Clearly shown is a seat headrest 10 comprised of a base 11 with a central horizontal opening 16 and one base arm 19 at each lateral end which serves as the mounting point for a first side cushion 12L and a second side cushion 12R. The side cushions (12L and 12R) and their attached hinge 13 readily snap into the base 11 at recess 17. Each hinge 13 also includes a push button 18. Full depression of push button 18 results in the release of the cantilever snaps 51, as can be seen better in FIG. 14, inside recess 17 to allow for ease of assembly and disassembly of the side cushions (12L and 12R) to the base 11. The base 11 is securely mounted to the existing car headrest in part using adjustable knobs 15.

Figure 10:
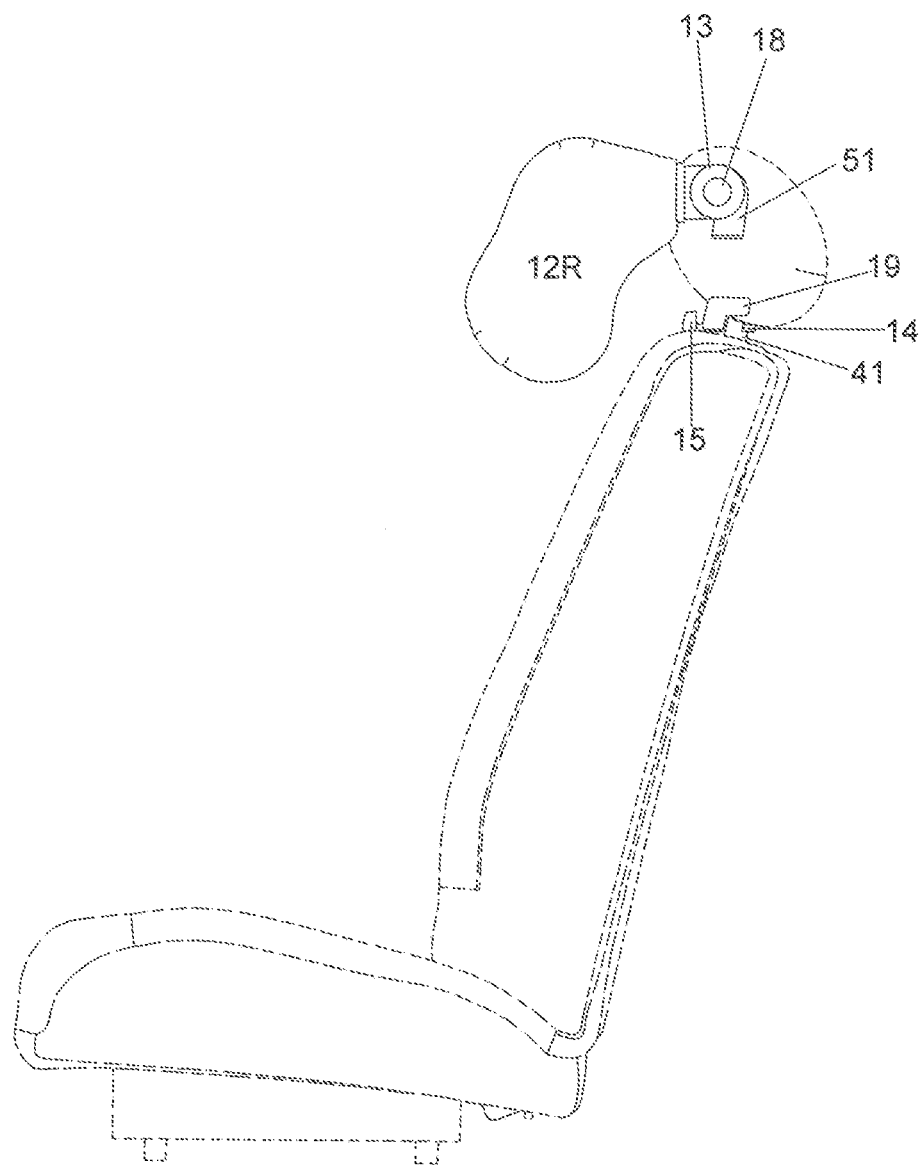
FIG. 10 illustrates a side view of the assembly of a side cushions to the base mount of the seat headrest.
Figure 11:
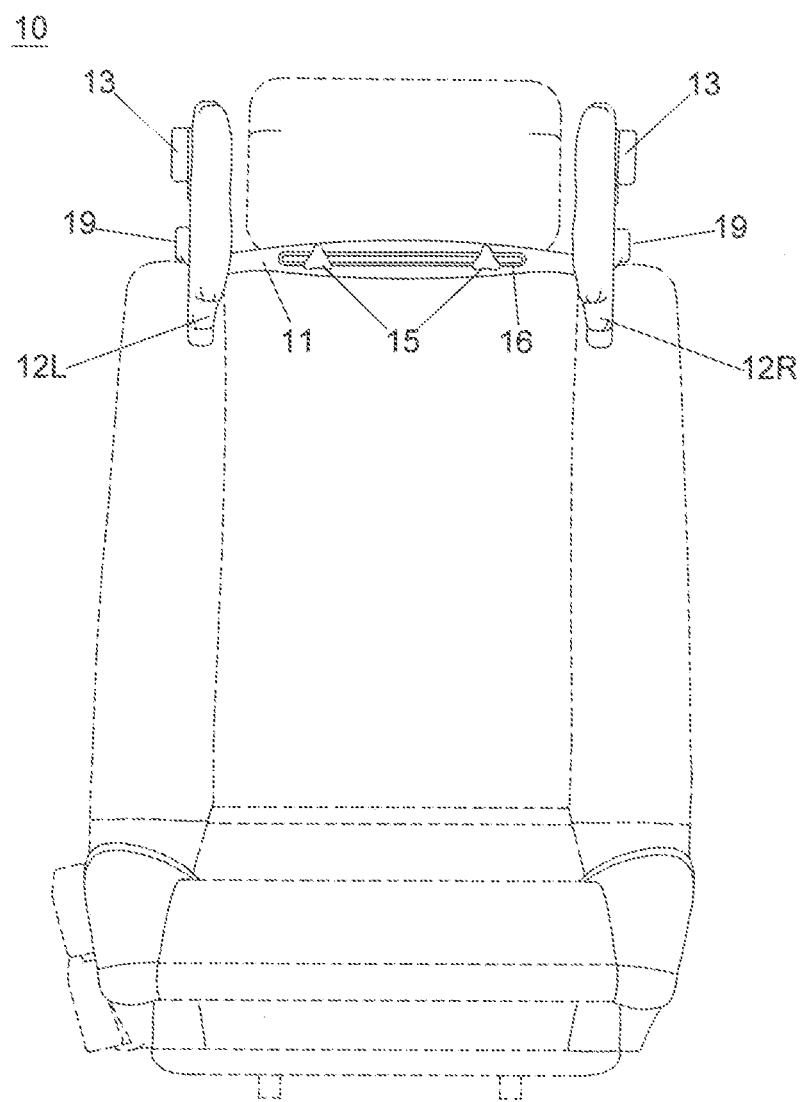
FIG. 11 illustrates a front view of the assembly of the side cushions to the base mount of the seat headrest.

Reference is made to FIGS. 10 and 11 which illustrate the side and front views respectively of the assembly of the side cushions 12L and 12R onto base 11 as shown in FIG. 9. In FIG. 10, the side cushion 12R is inserted into base 11 (not shown) at side arm 19 and secured with screw hook 14 and adjustable knob 15. Side cushion 12R also has a hinge 13 with a push button 18 and cantilever snaps 51 extending vertically downward from said hinge 13. In FIG. 11, the side cushions (12L and 12R) are inserted into base 11 at side arms 19. The side cushions (12L and 12R) each have a hinge 13. The base 11 is securely mounted to the existing car headrest in part using adjustable knobs 15 at central opening 16.

Reference is made to FIG. 12 which illustrates various views of the fully assembled seat headrest. FIG. 12a shows a perspective view of the assembled seat headrest comprised of a base 11 with a side arm 19 at each lateral end of base 11 and a central opening 16, a first side cushion 12L and a second side cushion 12R, each side cushion having a hinge 13 with a push button 18, at least two screw hooks 14 and at least two adjustable knobs 15. FIG. 12b shows a top view of the assembled seat headrest comprised of a base 11, a first side cushion 12L and a second side cushion 12R, each side cushion having a hinge 13, at least two screw hooks 14 and at least two adjustable knobs 15. FIG. 12c shows a rear view of the assembled seat headrest comprised of a base 11 with a central opening 16, a first side cushion 12L and a second side cushion 12R, each side cushion having a hinge 13. FIG. 12d shows the left side view of the assembled seat headrest comprised of a base 11 with a side arm 19, at least one screw hook 14 and at least one adjustable knob 15, and a first side cushion 12L having a hinge 13 with a push button 18. FIG. 12e shows the front view of the assembled seat headrest comprised of a base 11 with a side arm 19 at each lateral end of base 11 and a central opening 16 with at least two adjustable knobs 15, a first side cushion 12L and a second side cushion 12R, each side cushion having a hinge 13. FIG. 12f shows the right side view of the assembled seat headrest base 11 with a side arm 19, at least one screw hook 14 and at least one adjustable knob 15, and a second side cushion 12R having a hinge 13 with a push button 18.

Reference is made to FIG. 13 which illustrates various exploded views of the disassembled seat headrest shown in FIG. 12. FIG. 13a shows a perspective view of a base 11 with a side arm 19 at each lateral end of base 11 and a central opening 16, each side arm 19 having a recess 17, a first side cushion 12L and a second side cushion 12R, each side cushion having a hinge 13 with a push button 18, at least two screw hooks 14 and at least two adjustable knobs 15. FIG. 13b shows the top view of a seat headrest comprised of a base 11, a first side cushion 12L and a second side cushion 12R, each side cushion having a hinge 13, at least two screw hooks 14 and at least two adjustable knobs 15. FIG. 13c shows the rear view of a seat headrest comprised of a base 11 with side arms 19 and a central opening 16, a first side cushion 12L and a second side cushion 12R, each side cushion having a hinge 13, each hinge 13 having a pair of cantilever snaps 51 extending downward from said hinge 13. FIG. 13d shows the left side view of a seat headrest comprised of a base 11 with a side arm 19, at least one screw hook 14 and at least one adjustable knob 15, and a first side cushion 12L having a hinge 13 with a push button 18 and a pair of cantilever snaps 51 extending downward from said hinge 13. FIG. 13e shows the front view of the seat headrest comprised of a base 11 with a side arm 19 at each lateral end of base 11 and a central opening 16 with at least two adjustable knobs 15, a first side cushion 12L and a second side cushion 12R, each side cushion having a hinge 13. FIG. 13f shows the right side view of a seat headrest comprised of a base 11 with a side arm 19, at least one screw hook 14 and at least one adjustable knob 15, and a second side cushion 12R having a hinge 13 with a push button 18 and a pair of cantilever snaps 51 extending downward from said hinge 13.

Figure 14:
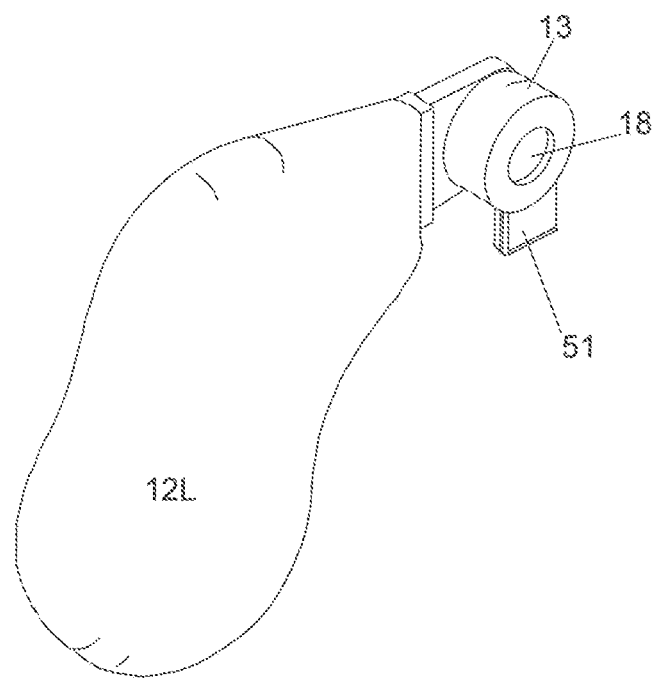
FIG. 14 illustrates a perspective view of the side cushion of the seat headrest.

Reference is made to FIG. 14 which illustrates a close up view of a side cushion of the seat headrest. The first side cushion 12L has a hinge 13 comprised of a push button 18 in the center of said binge 13 and pair of cantilever snaps 51 extending vertically downward from said hinge 13.

Figure 15:
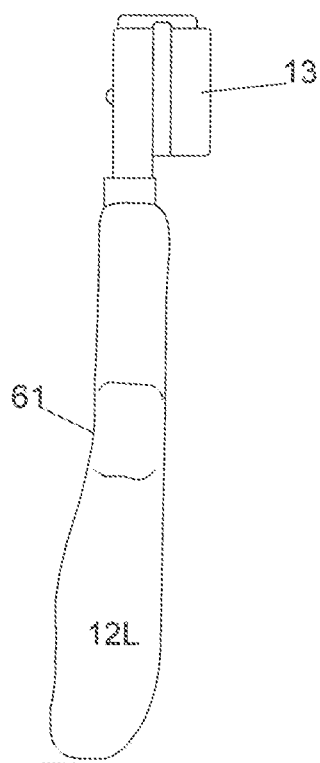
FIG. 15 illustrates a top view of the side cushion of the seat headrest.

Reference is made to FIG. 15 which illustrates the contour nature of the side cushions 12. A top view of a side cushion 12L and attached hinge 13 are shown. The bottom most end of the side cushion 12L has an angle between 15° and 25° beginning preferably at the midpoint 61 of said side cushion 12L.

Figure 16:
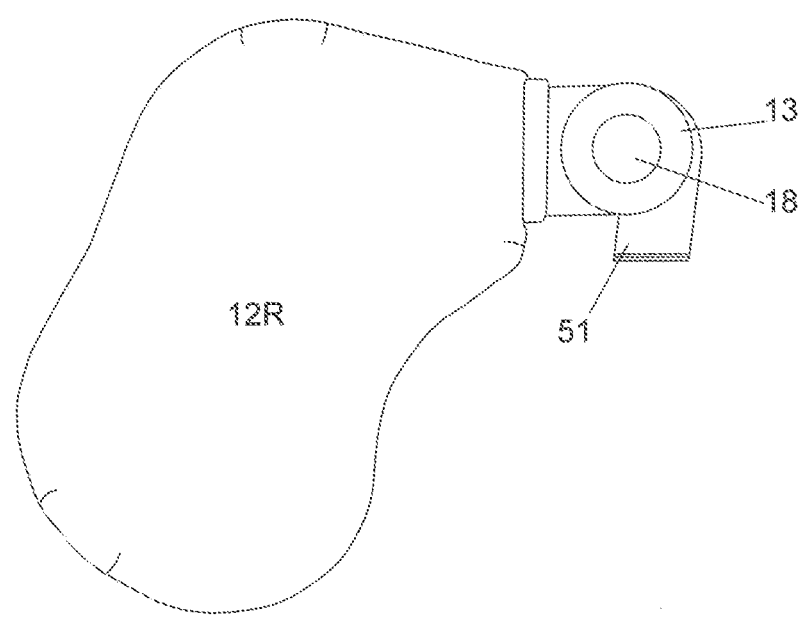
FIG. 16 illustrates a side view of the side cushion of the seat headrest.

Reference is made to FIG. 16 which illustrates the side view of the side cushion of the seat headrest shown in FIG. 14. The side cushion 12R has an attached hinge 13 with a push button 18 and a pair of cantilever snaps 51 extending vertically downward from said hinge 13. In a preferred embodiment, the side cushion 12R may be covered by a padded material such as foam to provide a soft, cushioned surface. The side cushion is then wrapped by a soft outer material such as fabric or nylon to cover the padded material and provide a more desirable aesthetic. The soft outer material can have a design print or be monochrome without departing from the spirit of the present invention.

Figure 17:
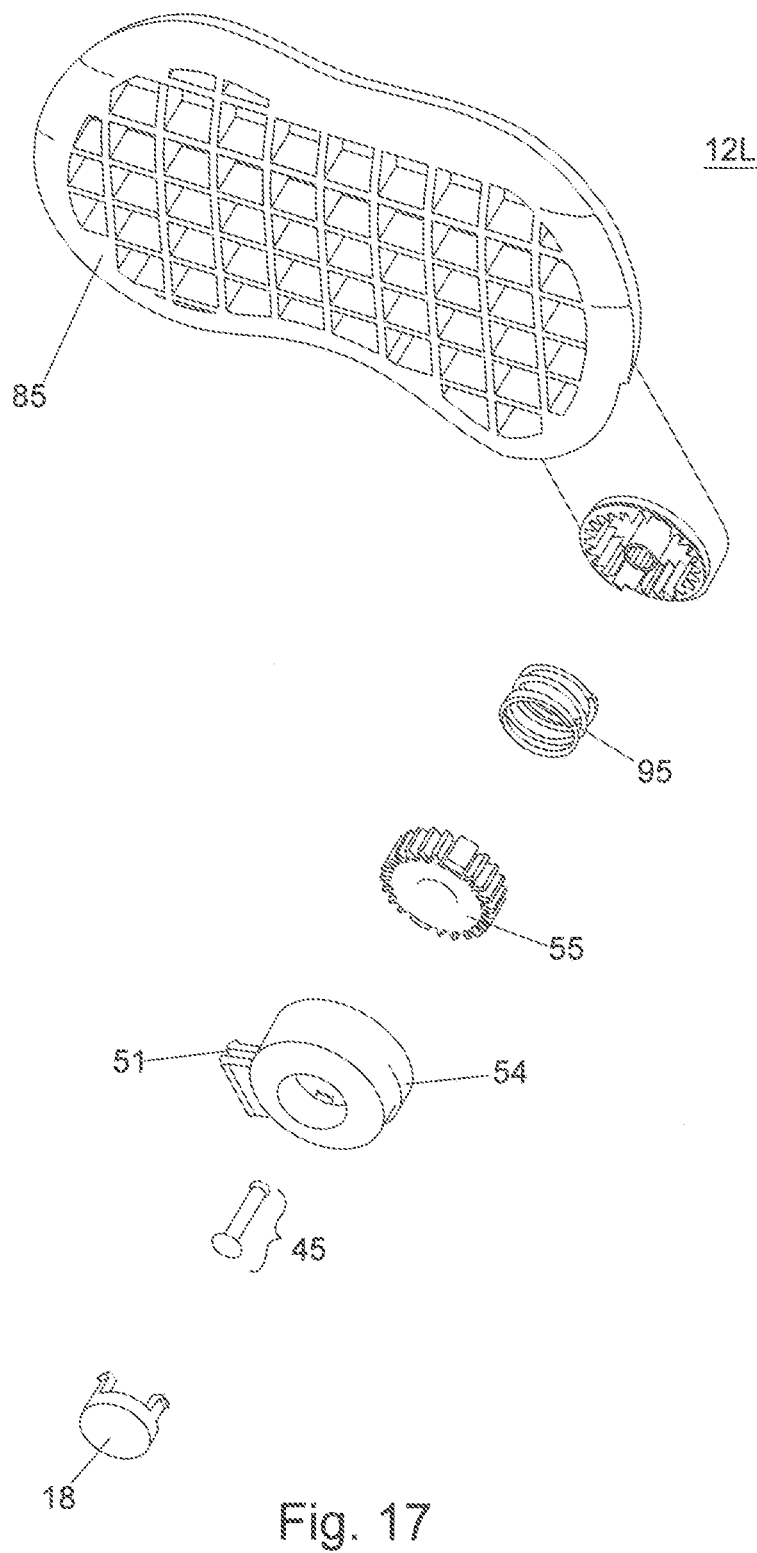
FIG. 17 illustrates an exploded view of the hinge within the side cushion of the seat headrest.

Reference is made to FIG. 17 which illustrates the hinge 13 integrated into each of the first and second side cushions. The first side cushion 12L and integrated hinge 13 is further comprised of a push button 18 that once pressed engages and disengages a gear 55 and a compression spring 95 to allow said side cushion to move freely between locking positions. The gear 55 and compression spring 95 are held together by a pin 45 within the hinge cap 54. The hinge 13 provides vertical adjustment of the side cushions (12L and 12R) to accommodate the height and comfort needs of the user or in the alternative to allow the side cushions (12L and 12R) to be moved out of the way when not in use, such as when a user is entering or exiting the vehicle. The side cushion 12L may have a waffled structure 85 to reduce the manufacturing costs of the cushions as well as the overall weight of the cushions. In yet another alternative embodiment the push button 18 within the integrated hinge 13 may be recessed in relation to the hinge cap.

Figure 18:
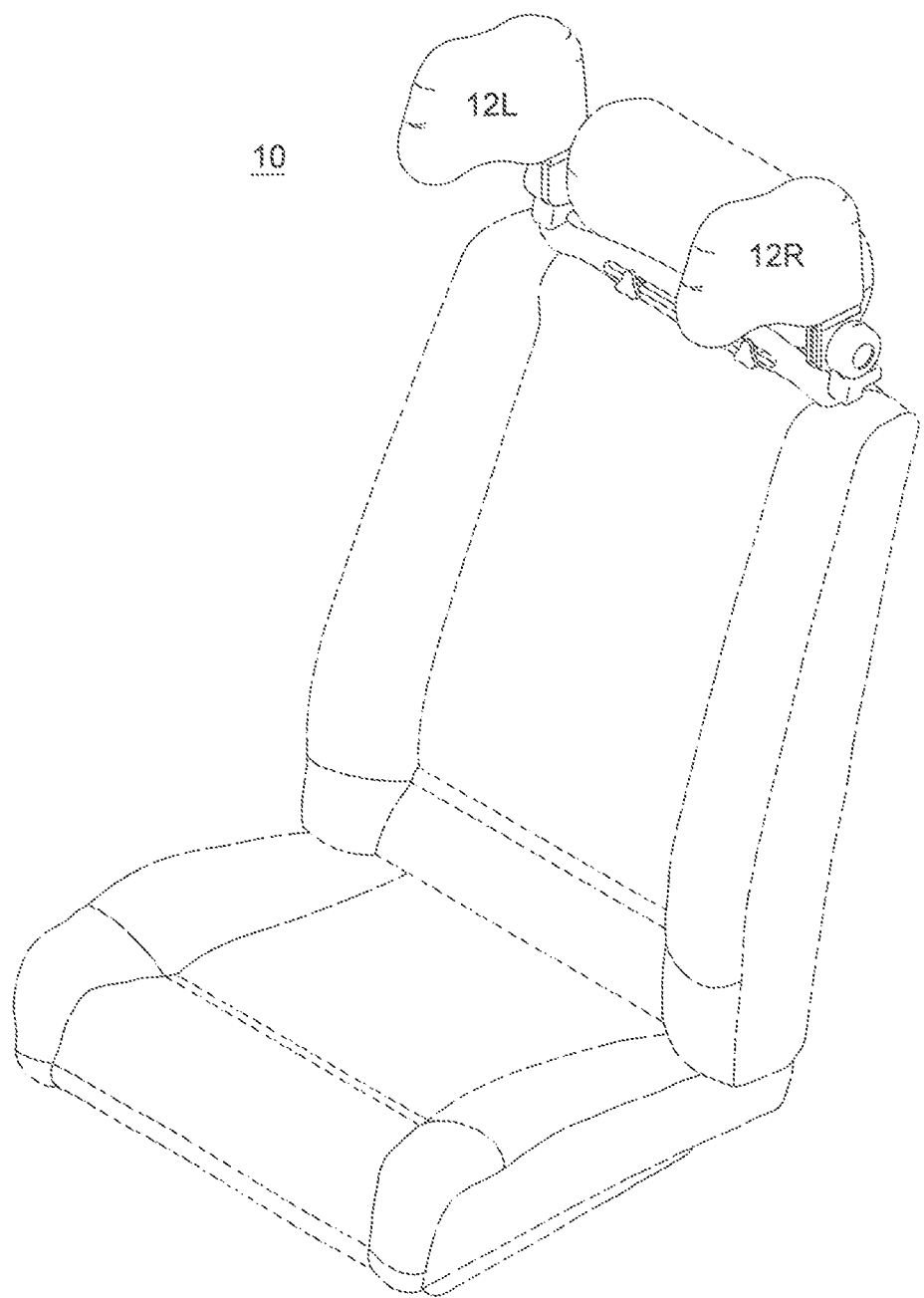
FIG. 18 illustrates a perspective view of a second alternative positioning of the seat headrest.
Figure 19:
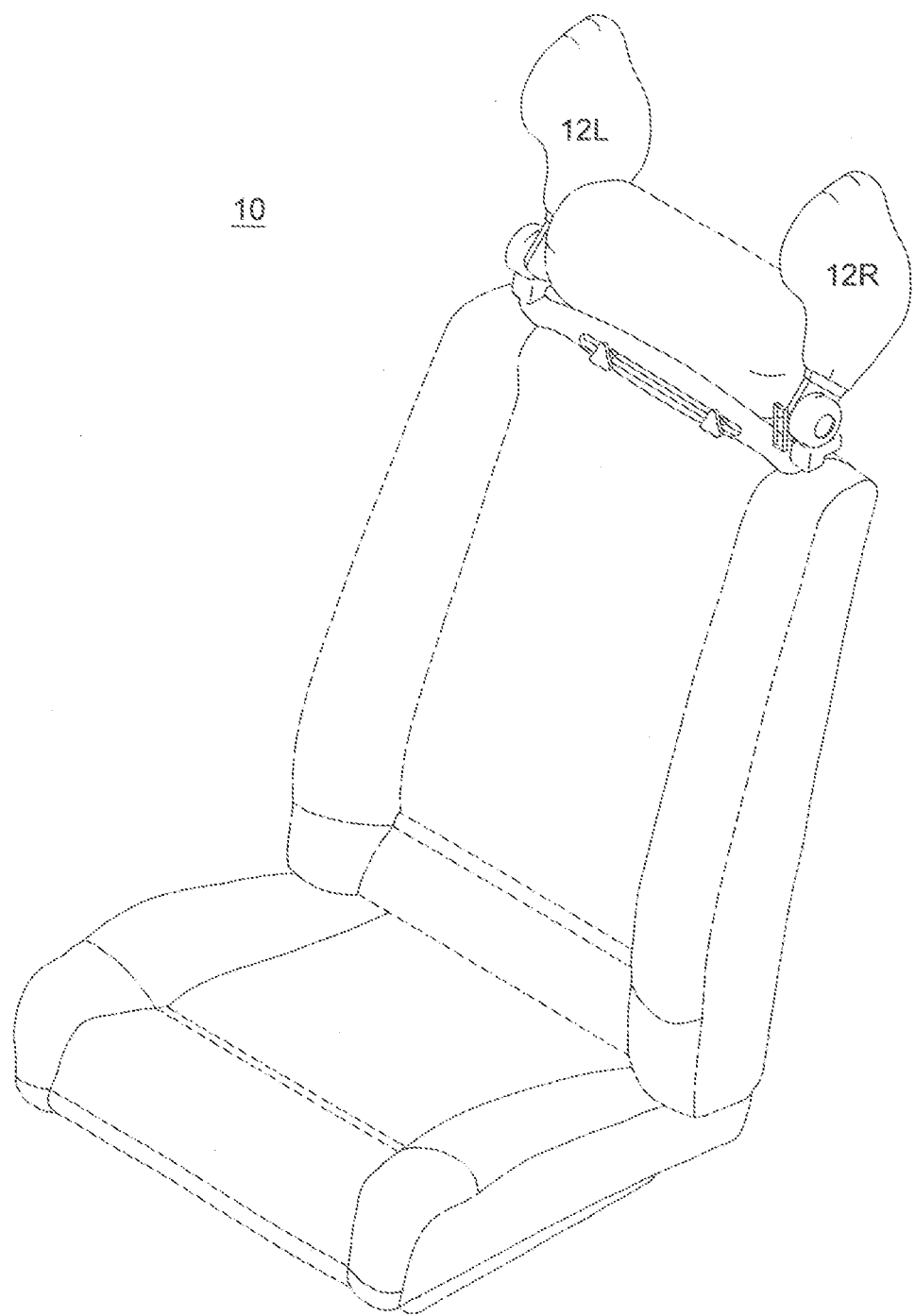
FIG. 19 illustrates a perspective view of a third alternative positioning of the seat headrest.

Reference is made to FIGS. 18 and 19 which illustrate alternative positioning of the side cushions of the fully assembled seat headrest 10. FIG. 18 shows the vertical repositioning of the side cushions (12L and 12R) of the seat headrest. FIG. 19 shows the side cushions (12L and 12R) in the stowed position when not in use.

Reference is made to FIG. 20 which illustrates several views of an assembled airplane seat headrest having a screw binding 100. FIG. 20a shows a perspective view of the airplane seat headrest having a screw binding 100 and a side cushion 96. Side cushion 96 is attached to adjustable bracket 97 such that a user or installer can attach the seat headrest to an airplane seat (not shown). The seat headrest is secured to the seat with adjustable bracket 97 by rotating the screw cap 99 in a clockwise direction thereby rotating screw 98 and tightening screw binding 100. Conversely, to remove the airplane seat headrest a user or installer rotates the screw cap 99 in a counter-clockwise direction such that the screw 98 loosens screw binding 100 making the seat headrest easy to remove from the seat. This installation method allows a user or airline to install and remove the airplane seat headrest easily and as desired. Further, adjacent the adjustable bracket 97 is a hinge 13 having a push button 18 configured for rotation of side cushion 96. Compression of push button 18 allows a user to change the vertical position of side cushion 96 to a position most comfortable for the user. FIG. 20b shows a top view of an airplane seat headrest having a screw binding 100 and a side cushion 96 the side cushion 96 being adjacent to adjustable bracket 97. Shown is a top view of screw 98 configured within adjustable bracket 97 having a screw cap 99 at the end of screw 98 closest to hinge 13. FIG. 20c shows a front view of airplane seat headrest and side cushion 96 in relation to adjustable bracket 97 and hinge 13. FIG. 20d shows a left side view of airplane seat headrest having side cushion 96 attached to screw binding 100, which is further comprised of adjustable bracket 97, a screw 98 and screw cap 99. FIG. 20e shows a right side view of the airplane seat headrest having a side cushion 96 attached to hinge 13 with push button 18, which is adjacent to screw binding 100 which is further comprised of an adjustable bracket 97, a screw 98 and a screw cap 99.

Reference is made to FIG. 21 which illustrates several views of an airplane seat headrest having a strap binding 101. FIG. 21a shows a perspective view of the airplane seat headrest having a strap binding 101 with a side cushion 96. The side cushion is attached to an adjustable strap bracket 102 such that a user or installer can attach the seat headrest onto an airplane seat (not shown) secured to the seat using strap 103 attached to adjustable strap bracket 102 by pin 104 (as visible in FIG. 21d). In order to secure the airplane seat headrest to the seat, a user or installer first places the airplane seat headrest on the seat (not shown) with strap binding 101 sitting on top of the seat and pulling on the end of the strap 103. Once the airplane seat headrest is sufficiently secure, the user may release strap 103. In order to remove the airplane seat headrest from the seat (not shown), a user or installer tugs on strap 103 in the direction opposite pin 104 thereby releasing strap 103 and loosening strap binding 101 which further allows a user or airline to install and/or remove the airplane seat headrest from the seat. This installation method allows a user or airline to install and/or remove the airplane seat headrest easily and as desired. Further, adjacent the adjustable strap bracket 102 is a hinge 13 having a push button 18 configured for rotation of side cushion 96. Compression of push button 18 allows a user to change the vertical position of side cushion 96 to a position most comfortable for the user. FIG. 21b shows a top view of an airplane seat headrest having a strap binding 101 and a side cushion 96, the side cushion 96 being adjacent to adjustable strap bracket 102. Shown is a top view of strap 103 configured within adjustable strap bracket 102 having a pin 104 (not shown) located at the end thereof, opposite side cushion 96. FIG. 21c shows a front view of the airplane seat headrest and side cushion 96 in relation to strap bracket 102 and hinge 13. FIG. 21d shows a left side view of the airplane seat headrest having side cushion 96 attached to strap binding 101, which is further comprised of adjustable strap bracket 102, strap 103 and pin 104. FIG. 21e shows a right side view of the airplane seat headrest having side cushion 96 attached to hinge 13 with push button 18, which is adjacent to strap binding 101 which is further comprised of adjustable strap bracket 102 having strap 103 and pin 104.

In an alternative embodiment the seat headrest utilizes a frictional hinge at the junction of the base atm. The frictional hinge is comprised of a plurality of washers, preferably constructed of nylon, and a bolt and nut to apply pressure to the frictional hinge to prevent movement of the side cushion once the side cushion is in the desired vertical position.

In another alternative embodiment, the hinge may be replaced with a pivot button having an integrated gear and compression spring to adjust the position of the side cushion.

An alternative embodiment reconfigures the positioning and structure of the base, the first side cushion and the second side cushion. The base would have a plurality of car headrest connector holes passing through the base. The plurality of car headrest connector holes allows for the car headrest poles to pass through the base securing the base to the car headrest. The base is then configured to extend in an outward direction forward of the car headrest. The first side cushion and the second side cushion would then be pivotally coupled to the base. The pivotal coupling allows the first side cushion and the second side cushion to pivot about an axis extending from the base. The angular position of the first side cushion and the second side cushion would be fixed by a frictional hinge.

A further still alternative embodiment the headrest functions as a supplemental head rest for an airplane seat. The seat headrest may be secured to the seat by means of a screw binding or a strap binding. In a preferred embodiment the user by use two completely separate headrests in conjunction with an airplane seat in order to provide comfort on both sides of the head while flying.

It is contemplated that the present invention be used in conjunction with booster seats. Toddlers that are too big for car seats but are too small to use the standard seat belt are required to ride in booster seats. Often, the child in the booster seat is also too small to benefit from the position of the traditional seat headrest because of their small stature and the fact that standard car headrests are designed to fit the average adult. The present invention provides for supplemental support for the head and neck of a child using a booster seat without requiting permanent alteration of the existing seat headrest. The user can also be an adult seeking additional support while traveling in a vehicle without departing from the scope of the invention.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

Insubstantial changes from the claimed subject matter as viewed by a person with ordinary skill in the art, now known or later devised, are expressly contemplated as being equivalently within the scope of the claims. Therefore, obvious substitutions now or later now to one with ordinary skill in the art are defined to be within the scope of the defined elements.

While the particular seat headrest as herein shown and disclosed in detail is hilly capable of obtaining the objects and providing the advantages herein before stated, it is to be understood that it is merely illustrative of the presently preferred embodiments of the invention and that no limitations are intended to the details of construction or design herein shown other than as described in the appended claims.

We claim:

1. A supplemental seat headrest for providing head and neck support to a user in a passenger airplane when used in conjunction with an existing seat configuration, the supplemental seat headrest comprising:
    a side cushion; and
    a mounting mechanism, the mounting mechanism comprising:
        an adjustable bracket with first and second plates slidably engaging each other in a common horizontal plane for sliding retraction and protraction in a clamping direction; wherein a horizontal force applied to the plates causes relative motion of the plates; and
        wherein the bracket is lengthwise in the clamping direction and thus has a low profile in a vertical direction, and the side cushion is pivotally connected to the bracket above the plane and is configured such that a portion of the cushion is pivotable to positions both above and below the plane.

2. The supplemental seat headrest of claim 1, wherein the mounting mechanism fits securely in a horizontal orientation at the top of the seat configuration to the left side or right side of an existing seat headrest.

3. The supplemental seat headrest of claim 2, wherein the mounting mechanism is configured as a screw binding.

4. The supplemental seat headrest of claim 3, wherein the screw binding comprises:
    the adjustable bracket;
    a screw; and
    a screw cap.

5. The supplemental seat headrest of claim 4, wherein the adjustable bracket is configured to receive the side cushion and attach thereto by the pivotal connection.

6. The supplemental seat headrest of claim 5, wherein the adjustable bracket is configured to receive the screw having the screw cap at the end of the screw.

7. The supplemental seat headrest of claim 4, wherein the screw cap is rotated in a clockwise direction, thereby tightening the screw binding and securing the screw binding to the existing seat configuration.

8. The supplemental seat headrest of claim 4, wherein the screw cap is rotated in a counter-clockwise direction, thereby loosening the screw binding for removal of the supplemental seat headrest from the existing seat configuration.

9. The supplemental seat headrest of claim 4, wherein the side cushion is configured in a downward orientation from the adjustable bracket to point generally downward towards a user's shoulders.

10. The supplemental seat headrest of claim 2, wherein the mounting mechanism is configured as a strap binding.

11. The supplemental seat headrest of claim 10, wherein the strap binding comprises:
    the adjustable bracket; and
    a strap.

12. The supplemental seat headrest of claim 11, wherein the adjustable strap bracket is configured to receive the side cushion and attach thereto by the pivotal connection.

13. The supplemental seat headrest of claim 11, wherein the adjustable bracket is configured to receive a strap.

14. The supplemental seat headrest of claim 11, wherein the strap is configured to be secured by a pin, the pin located at an end of the strap opposite the side cushion.

15. The supplemental seat headrest of claim 11, wherein the strap is pulled toward the pin, secured to the pin, thereby tightening the strap binding and securing the strap binding to the existing seat configuration.

16. The supplemental seat headrest of claim 11, wherein the strap is pulled in the direction opposite the pin thereby releasing the strap and loosening the strap binding for removal of the supplemental seat headrest from the existing seat configuration.

17. The supplemental seat headrest of claim 11, wherein the side cushion is configured in a downward orientation from the adjustable bracket to point generally downward towards a user's shoulders.

18. The supplemental seat headrest of claim 1, wherein the side cushion is further comprised of an integrated hinge.

* * * * *

UNITED STATES PATENT AND TRADEMARK OFFICE
CERTIFICATE OF CORRECTION

PATENT NO. : 9,701,231 B2
APPLICATION NO. : 14/860399
DATED : July 11, 2017
INVENTOR(S) : Arriola et al.

Page 1 of 1

It is certified that error appears in the above-identified patent and that said Letters Patent is hereby corrected as shown below:

In the Specification

Column 1, Line 26: the word "headrest" should read "headrests";

Column 1, Line 29: the word "a" should be replaced with the word "the";

Column 1, Line 34: the word "sufficiently" should read "sufficient";

Column 1, Line 56: the word "retraining" should read "restraining";

Column 2, Line 2: the word "preventing" should read "prevent";

Column 4, Line 5: insert the word --the-- before the word "central";

Column 4, Line 30: insert the word --the-- before the word "central";

Column 4, Line 38: insert the word --the-- before the word "opening"; and

Column 4, Line 58: insert the word --the-- before the word "central".

Signed and Sealed this
Fifth Day of September, 2017

Joseph Matal
*Performing the Functions and Duties of the
Under Secretary of Commerce for Intellectual Property and
Director of the United States Patent and Trademark Office*